(12) United States Patent
Koopmans et al.

(10) Patent No.: US 11,370,874 B2
(45) Date of Patent: Jun. 28, 2022

(54) METHOD FOR THE PRODUCTION OF THERMOPLASTIC POLYOXAZOLIDONE POLYMERS

(71) Applicant: Covestro Deutschland AG, Leverkusen (DE)

(72) Inventors: Carsten Koopmans, Hilden (DE); Christoph Guertler, Cologne (DE); Aurel Wolf, Wülfrath (DE); Elena Frick-Delaittre, Cologne (DE); Kai Laemmerhold, Aachen (DE); Claudine Rangheard, Munich (DE); Timo Breuer, Kerpen (DE)

(73) Assignee: Covestro Deutschland AG, Leverkusen (DE)

( * ) Notice: Subject to any disclaimer, the term of this patent is extended or adjusted under 35 U.S.C. 154(b) by 305 days.

(21) Appl. No.: 16/642,151

(22) PCT Filed: Sep. 11, 2018

(86) PCT No.: PCT/EP2018/074428
§ 371 (c)(1),
(2) Date: Feb. 26, 2020

(87) PCT Pub. No.: WO2019/052994
PCT Pub. Date: Mar. 21, 2019

(65) Prior Publication Data
US 2020/0354502 A1    Nov. 12, 2020

(30) Foreign Application Priority Data
Sep. 15, 2017    (EP) .................................... 17191376

(51) Int. Cl.
*C08G 18/00* (2006.01)
*C08G 18/22* (2006.01)
*C08G 18/76* (2006.01)

(52) U.S. Cl.
CPC ......... *C08G 18/003* (2013.01); *C08G 18/225* (2013.01); *C08G 18/7671* (2013.01)

(58) Field of Classification Search
CPC . C08G 18/003; C08G 18/225; C08G 18/7671
See application file for complete search history.

(56) References Cited

FOREIGN PATENT DOCUMENTS

| EP | 3357949 A1 | 8/2018 |
|---|---|---|
| WO | 9955772 | 11/1999 |
| WO | 2016128380 A1 | 8/2016 |

OTHER PUBLICATIONS

Dyen, M. E. and Swern, D., Chem. Rev., 67, 197, 1967, "2-Oxazolidones".
Herweh, J.E. and Whitmore, W.Y., J. Polym. Sci. 8 (1970) 2759-2773, "Poly-2-oxazolidones: Preparation and Characterization".
International Search Report, PCT/EP2018/074428, dated Oct. 5, 2018, Authorized officer: Martin Bergmeier.

*Primary Examiner* — Rabon A Sergent
(74) *Attorney, Agent, or Firm* — Donald R. Palladino

(57) ABSTRACT

A process for producing thermoplastic polyoxazolidinone, comprising the following steps: (i) Reaction of a diisocyanate compound (A) with a bisepoxide compound (B) in the presence of a catalyst (C) and a compound (D) in a solvent (E) forming an intermediate compound (F) and (ii) Reaction of a compound (G) with the intermediate (F) formed in step (i), wherein compound (D) is one or more compounds selected from the group consisting of monofunctional isocyanate and monofunctional epoxide, and wherein compound (G) is an alkylene oxide. The invention is also related to the resulting thermoplastic polyoxazolidinone.

15 Claims, No Drawings

METHOD FOR THE PRODUCTION OF THERMOPLASTIC POLYOXAZOLIDONE POLYMERS

CROSS-REFERENCE TO RELATED APPLICATION

This application is a national stage application under 35 U.S.C. § 371 of PCT/EP2018/074428, filed Sep. 11, 2018, which claims the benefit of European Application No. 17191376.7, filed Sep. 15, 2017, each of which is incorporated herein by reference.

FIELD

A process for producing thermoplastic polyoxazolidinone, comprising the following steps: (i) Reaction of a diisocyanate compound (A) with a bisepoxide compound (B) in the presence a catalyst (C) and a compound (D) in a solvent (E) forming an intermediate compound (F) and (ii) Reaction of a compound (G) with the intermediate (F) formed in step (i), wherein compound (D) is one or more compounds selected from the group consisting of monofunctional isocyanate and monofunctional epoxide, and wherein compound (G) is an alkylene oxide. The invention is also related to the resulting thermoplastic polyoxazolidinone.

BACKGROUND

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, Chem. Rev., 67, 197, 1967). Due to these disadvantages there was the need for alternative methods for the production of oxazolidinones especially for application of oxazolidinones as structural motif in polymer applications.

WO 2016/128380 A1 discloses thermoplastic polyoxazolidinone with thermal stability, a method for the production of thermoplastic polyoxazolidinone, comprising the step of reacting a biscarbamate or diisocyanate compound with a bisepoxide compound in the presence of a mono-carbamate, a mono-isocyanate and/or a mono-epoxide compound as chain regulator and a suitable base having a pKb value of ≤9 as catalyst. Thermoplastic polyoxazolidinone are obtained by the polycondensation route, wherein biscarbamates and bisepoxides reacted in the presence of amine catalysts in batch mode or semi-batch mode. The chain group regulators were added in a second step.

In addition, one example discloses the thermoplastic polyoxazolidinone formation by polyaddition route, wherein the diisocyanate compound is added in a semi-batch process to the mixture of a bisepoxide compound and the catalyst. After 16 h a monofunctional isocyanate compound was added to the thermoplastic polyoxazolidinone mixture. The overall reaction time was 22 hours.

The non-published patent application EP 17154416.6 discloses a method for the production of thermoplastic polyoxazolidinone with slightly increased dynamic viscosity and also increased thermal stability by controlling the regioselectivity of the 5-oxazolidinone and 4-oxazolidinone regioisomers. The thermoplastic polyoxazolidinones are obtained by the polycondensation route which comprises at least one biscarbamate compound with at least one bisepoxide compound in the presence of at least one base, at least one Lewis acid catalyst, and optionally at least one chain group regulator, wherein the chain group regulator comprising a mono-carbamate group, a mono-isocyanate group and/or a mono-epoxide group, and wherein the base having a pKb-value of ≤9. In a first step the biscarbamate compound is reacted with the bisepoxide compound in the presence of a base and a Lewis acid catalyst in batch process followed by the addition of a monofunctional chain group regulator in a second step.

The scientific publication J. Polym. Sci. 8 (1970) 2759-2773 discloses polyoxazolidinones prepared from various bisepoxides and various diisocyanates in the presence of alkaline metal halogenide catalysts. A solution of equimolar bisepoxide and diisocyanate amounts is added dropwise to a reactor containing a LiCl catalyst dissolved in DMF under reflux conditions within 1 h and a subsequent post reaction of 12 to 23 h was carried out under reflux conditions in order to complete the reaction. The addition of monofunctional chain-group regulators is not disclosed.

Objective of the present invention was therefore to identify an optimized and simple process for the preparation of thermoplastic polyoxazolidinones with improved thermal stability than the already known thermoplastic polyoxazolidinones by the polyaddition route and especially to develop suitable process conditions. The high thermal stability of the synthesized thermoplastic polyoxazolidinones at temperatures up to 260° C. to 280° C. for several minutes is crucial for subsequent extrusion and injection molding processes that need to be carried out above the glass transition temperature of the thermoplastic polyoxazolidinone materials.

In addition, the latter process conditions should enable a high reactivity and reduce the reaction time to already known processes for the preparation of thermoplastic polyoxazolidinones by the polyaddition route to establish an economic process and a high selectivity towards thermoplastic polyoxazolidinone formation to minimize costs for downstreaming and optimize the performance of resulting thermoplastic polyoxazolidinones. Due to the reduced number of side products that can decompose and/or evaporate during subsequent extrusion and injection molding processes compared to the known system higher thermostability than the already known thermoplastic polyoxazolidinones which are useful as thermoplastic material (higher decomposition temperature $T_{Donset}$) should be obtained.

SUMMARY

Surprisingly, it has been found that the problem can be solved by a process for producing thermoplastic polyoxazolidinone, comprising the following steps:
(i) Reaction of a diisocyanate compound (A) with a bisepoxide compound (B) in the presence of a catalyst (C) and a compound (D) in a solvent (E) forming an intermediate compound (F)
(ii) Reaction of a compound (G) with the intermediate (F) formed in step (i),
wherein compound (D) is one or more compounds selected from the group consisting of monofunctional isocyanate, monofunctional epoxide, and
wherein compound (G) is an alkylene oxide.

As used herein, the term "thermoplastic polyoxazolidinone" is meant to denote compounds containing at least two oxazolidinone groups in the molecule. The thermoplastic polyoxazolidinone are obtainable by the reaction of a diisocyanate compound with a bisepoxide compound.

In an embodiment of the invention step (i) comprises the following sub-steps:

(i-1) placing a solvent (E) and a catalyst (C) in a reactor to provide a mixture, (i-2) placing the diisocyanate compound (A), the bisepoxide compound (B) and the compound (D) in a vessel to provide a mixture and (i-3) adding the mixture resulting from step (i-2) to the mixture resulting from step (i-1).

In a preferred embodiment of the invention step, the mixture resulting from step (i-2) is added in a continuous manner to the mixture of step (i-1). In an alternative embodiment of the invention to the continuous addition step the mixture resulting from step (i-2) is added in a step-wise manner with two or more individual addition steps to the mixture of step ((i-1).

In an embodiment of the method according to the invention step i) is performed at reaction temperatures of ≥130° C. to ≤280° C., preferably at a temperature of ≥140° C. to ≤240° C., more preferred at a temperature of ≥155° C. to ≤210° C. If temperatures below 130° C. are set, the reaction is generally very slow. At temperatures above 280° C., the amount of undesirable secondary products increases considerably.

In an embodiment of the method according to the invention step i) is performed at reaction times of 1 h to 20 h, preferably at 1 h to 10 h and more preferably at 1 h to 6 h.

In an embodiment of the method according to the invention step i) is performed at reaction temperatures of ≥130° C. to ≤280° C. and a reaction time of 1 h to 6 h.

In an embodiment of the method according to the invention step ii) is performed at reaction temperatures of ≥130° C. to ≤280° C., preferably at a temperature of ≥140° C. to ≤240° C., more preferred at a temperature of ≥155° C. to ≤210° C. If temperatures below 130° C. are set, the reaction is generally very slow. At temperatures above 280° C., the amount of undesirable secondary products increases considerably.

In an embodiment of the method according to the invention step ii) is performed at reaction times of 1 h to 20 h, preferably at 1 h to 10 h and more preferably at 1 h to 6 h.

In an embodiment of the method according to the invention step ii) is performed at reaction temperatures of ≥130° C. to ≤280° C. and a reaction time of 1 h to 6 h.

DETAILED DESCRIPTION

Diisocyanate Compound (A)

As used herein, the term "diisocyanate compound (A)" is meant to denote diisocyanate compounds having two isocyanate groups (I=2), isocyanate-terminated biurets, isocyanurates, uretdiones, carbamates and/or isocyanate-terminated prepolymers.

In an embodiment of the method according to the invention the diisocyanate compound (A) is at least one compound selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexyl propane, poly(hexamethylene diisocyanate), octamethylene diisocyanate, tolylene-α,4-diisocyanate, poly(propylene glycol) tolylene-2,4-diisocyanate terminated, poly(ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)]diisocyanate, poly(tetrafluoroethylene oxide-co-difluoromethylene oxide) α,ω-diisocyanate, 1,4-diisocyanatobutane, 1,8-diisocyanatooctane, 1,3-bis(1-isocyanato-1-methylethyl) benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI) and biurets, isocyanurates, carbamates and uretdiones of the aforementioned isocyanates.

More preferred the diisocyanate compound (A) is selected from the group comprising of tolylene-α,4-diisocyanate, poly(propylene glycol) tolylene-2,4-diisocyanate terminated, 2,4,6-trimethyl-1,3-phenylene diisocyanate, 4-chloro-6-methyl-1,3-phenylene diisocyanate, 3,3'-dimethyl-4,4'-biphenylene diisocyanate, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI), diphenylmethane diisocyanate (MDI), naphthalene-,5-diisocyanate, 1,3-phenylene diisocyanate, 1,4-diisocyanatobenzene, 2,4- or 2,5- and 2,6-diisocyanatotoluene (TDI) or mixtures of these isomers.

And most preferred the diisocyanate compound (A) is selected from the group consisting of diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

A mixture of two or more of the aforementioned diisocyanate compounds (A) can also be used.

Bisepoxide Compound (B)

As used herein, the term "bisepoxide compound (B)" is meant to denote diepoxide compounds having two epoxide groups (F=2).

In a preferred embodiment of the invention the bisepoxide compound (B) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether and diglycidyl isophthalate.

More preferred the bisepoxide compound (B) is selected from the group consisting of resorcinol diglycidyl ether, bisphenol A diglycidyl ether, and bisphenol F diglycidyl ether.

Most preferred the bisepoxide compound (B) is selected from the group consisting of bisphenol A diglycidyl ether, and bisphenol F diglycidyl ether.

A mixture of two or more of the aforementioned bisepoxide compounds (B) can also be used.

The molecular weight of the obtained thermoplastic polyoxazolidinone is determined by the molar ratio of the bisepoxide compound (B) relative to diisocyanate compound (A) and optionally relative to the compound (D).

The molar ratio of bisepoxide compound (B) to diisocyanate compound (A) is preferably in the range from 1:2 to 2:1, more preferably in the range from 45:55 to 2:1 and even more preferably in the range 47.8:52.2 to 52.2:47.8.

When the diisocyanate compound (A) is employed in excess, preferably a mono-epoxide is employed as compound (D). When the bisepoxide compound (B) is employed in excess, preferably a mono-isocyanate is employed as compound (D).

Catalyst (C)

In a preferred embodiment of the invention the catalyst (C) is at least one compound selected from the group consisting of Li(I), Rb(I), Cs(I), Ag(I), Au(I), Mg(II), Ca(II), Sr(II), Ba(II), Dy(II), Yb(II), Cu(II), Zn(II), V(II), Mo(II), Mn(II), Fe(II), Co(II) Ni(II), Pd(II), Pt(II), Ge(II), Sn(II), Sc(III), Y(III), La(III), Ce(III), Pr(III), Nd(III), Sm(III), Eu(III), Gd(III), Tb(III), Dy(III), Ho(III), Er(III), Tm(III), Yb(III), Lu(III), Hf(III), Nb(III), Ta(III), Cr(III), Ru(III), Os(III), Rh(III), Ir(III), Al(III), Ga(III), In(III), Tl(III), Ge(III), Ce(IV), Ti(IV), Zr(IV), Hf(IV), Nb(IV), Mo(IV), W(IV), Ir(IV), Pt(IV), Sn(IV), Pb(IV), Nb(V), Ta(V), Bi(V), Mo(VI), W(VI), and compounds represented by the formula (I)

$$[M(R1)(R2)(R3)(R4)]+nYn- \qquad (I)$$

wherein M is nitrogen, phosphorous or antimony, preferred phosphorous wherein (R1), (R2), (R3), (R4) are independently of one another selected from the group comprising linear or branched alkyl groups containing 1 to 22 carbon atoms, optionally substituted with heteroatoms and/or heteroatom containing substituents, cycloaliphatic groups containing 3 to 22 carbon atoms, optionally substituted with heteroatoms and/or heteroatom containing substituents, C1 to C3 alkyl-bridged cycloaliphatic groups containing 3 to 22 carbon atoms, optionally substituted with heteroatoms and/or heteroatom containing substituents and aryl groups containing 6 to 18 carbon atoms, optionally substituted with one or more alkyl groups containing 1 to 10 carbon atoms and/or heteroatom containing substituents and/or heteroatoms, wherein Y is a halide, carbonate, nitrate, sulfate or phosphate anion, more preferred a halide or carbonate and wherein n is an integer of 1, 2 or 3.

In a more preferred embodiment of the invention the catalyst (C) is at least one compound selected from the group consisting of LiCl, LiBr, LiI, MgCl2, MgBr2, MgI2, SmI3, Ph4SbBr, Ph4SbCl, Ph4PBr, Ph4PCl, Ph3(C6H4-OCH3) PBr, Ph3(C6H4-OCH3)PCl, Ph3(C6H4F)PCl, and Ph3 (C6H4F)PBr, preferred LiCl, LiBr, LiI and MgCl2.

In a more preferred embodiment of the invention the catalyst (C) is selected from the group consisting of LiCl, LiBr, and LiI.

In a more preferred embodiment of the invention the catalyst (C) is LiCl.

In one embodiment of the method according to the invention, the catalyst (C) is present in an amount of ≥0.001 to ≤5.0 weight-%, preferably in an amount of ≥0.01 to ≤3.0 weight-%, more preferred ≥0.05 to ≤0.2 weight-%, based on the theoretical yield of thermoplastic polyoxazolidinone.

Compound (D)

The compounds comprising a mono-epoxide group and/or a mono-isocyanate group are also denoted as "compound (D)" according to the invention. Compounds comprising a mono-isocyanate and/or a mono-epoxide group are preferred compounds and mono-epoxide groups are most preferred compounds (D) according to the invention.

In an embodiment of the invention the method for the production of the thermoplastic polyoxazolidinone is in the presence of the compound (D), wherein the compound (D) acts as a chain regulator for the thermoplastic polyoxazolidinone and further increases the thermal stability of the thermoplastic polyoxazolidinone In a preferred embodiment of the invention the compound (D) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide and/or n-hexylisocyanate, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentylphenyl isocyanate, 4-tert-butyl phenyl isocyanate, 1-naphthyl isocyanate, preferred 4-tert-butylphenyl glycidyl ether and 4-isopropylphenyl isocyanate.

In a preferred embodiment of the invention the compound (D) is selected from the group consisting of 4-tert-butylphenyl glycidyl ether, phenyl glycidyl ether, 4-isopropylphenyl isocyanate, and p-tolyl isocyanate.

In one embodiment of the method according to the invention, the compound (D) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone.

Mass Ratio

In an embodiment of the invention the calculated mass ratio of the sum of diisocyanate compound (A), the bisepoxide compound (B), and the compound (D) with respect to the sum of diisocyanate compound (A), the bisepoxide compound (B), the compound (D), and the solvent (E) in step (i) is from 5 wt-% to 30 wt-%, preferred from 8 wt-% to 26 wt-% and more preferred from 13 wt-% to 24 wt-%. The upper mass ratio of 30 wt-%, preferably 26 wt-% and more preferably 24 wt-% leads to an increased thermal stability of the thermoplastic polyoxazolidinone. The lower mass ratio of 5 wt-%, preferably 8 wt-% and more preferably 13 wt-% leads to less amount of solvent (E) optionally comprising solvent (E-1) that need to be separated and potentially purified. This leads to a more efficient overall process due to energy savings and reduction of solvent amounts.

Solvent (E)

The reaction according to the invention is performed in high boiling non-protic halogenated aromatic solvents, high-boiling non-protic aliphatic heterocyclic solvents, halogenated aromatic or aliphatic heterocyclic solvents.

Suitable solvents (E) are for example organic solvents such as linear or branched alkanes or mixtures of alkanes, toluene, xylene and the isomeric xylene mixtures, mesitylene, mono or polysubstituted halogenated aromatic solvents or halogenated alkane solvents, for example chlorobenzene, dichlorobenzene, dichloromethane, dichloroethane, tetrachloroethane, linear or cyclic ether such as tetrahydrofurane (THF) or methyl-tert-butylether (MTBE), linear or cyclic ester, or polar aprotic solvents such as 1,4-dioxane, acetonitrile, N,N-dimethylformamide (DMF), N,N-dimethylacetamide (DMAc), dimethylsulfoxide (DMSO), cyclic carbonate, such as ethylencarbonate or propylencarbonate, N-methylpyrrolidone (NMP), sulfolane, tetramethylurea, N,N'-dimethylethylenurea or mixtures of the above mentioned solvents and/or with other solvents. Preferred solvents (E) are 1,2-dichlorobenzene, sulfolane and N-methylpyrrolidone (NMP).

Solvent (E-1)

In an embodiment of the invention the solvent (E) in step (i-1) comprises a solvent (E-1). Preferred solvents (E-1) are sulfolane, gamma-butyrolactone, dimethylsulfoxide and N-methylpyrrolidone (NMP). The latter solvents (E-1) improve the solubility of the preferred lithium-based catalysts (C), such as LiCl, LiBr, and LiI.

Intermediate Compound (F)

In step (i) the diisocyanate compound (A) with a bisepoxide compound (B) in the presence a catalyst (C) and a compound (D) in a solvent (E) forming an intermediate compound (F), wherein the intermediate compound (F) has oxazolidinone structural units formed by the addition reaction of the diisocyanate compound (A) with a bisepoxide compound (B) and a compound (D).

In an embodiment of the invention the intermediate compound (F) has a number average molecular weight Mn from ≥500 to ≤500'000 g/mol, more preferred ≥1'000 to ≤50'000 g/mol and even more preferred ≥5'000 to ≤25'0000 g/mol as determined with gel permeation chromatography (GPC).

Compound (G)

In an embodiment of the invention the compound (G) is added in a step-wise manner with two or more individual addition steps or in continuous manner in step (ii) to the intermediate (F) formed in step (i).

In an embodiment of the invention the compound (G) is a monofunctional alkylene oxide (G-1).

In a preferred embodiment of the invention the compound (D) and compound (G) is the monofunctional alkylene oxide (G-1).

In one embodiment of the method according to the invention, the compound (G) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone.

Monofunctional Alkylene Oxide (G-1)

In an embodiment of the invention the monofunctional alkylene oxide (G-1) is at least one compound selected from the group consisting of phenyl glycidyl ether, o-kresyl glycidyl ether, m-kresyl glycidyl ether, p-kresyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide, N-glycidyl phthalimide, and 4-tert-butylphenyl glycidyl ether.

In a most preferred and most embodiment of the invention the monofunctional alkylene oxide (G-1) is 4-tert-butylphenyl glycidyl ether or phenyl glycidyl ether.

In one embodiment of the method according to the invention, the compound (G-1) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone.

Product-by-Process Claim

Another aspect of the present invention is a thermoplastic polyoxazolidinone, obtainable by a method according to the invention.

In an embodiment of the invention, the number average molecular weights Mn of the thermoplastic polyoxazolidinone is preferentially ≥500 to ≤500,000 g/mol, more preferred ≥1,000 to ≤50,000 g/mol and even more preferred ≥5,000 to ≤25,000 g/mol as determined with gel permeation chromatography (GPC) using an Agilent 1100 Series instrument with DMAC+LiBr (1.7 g·L-1) as the eluent, PSS GRAM analytical columns (1×100 Å, 2×3000 Å) from PSS, equipped with a refractive index (RI) detector a column flow rate set to 1 mL·min-1, in which calibration is performed with poly(styrene) standards (ReadyCal-Kit PS—Mp 370-2520000 Da from PSS), and the samples analysed using PSS WinGPC UniChrom V 8.2 Software.

Preferably, the molar amount of mono-epoxide and/or mono-isocyanate compound added as compound (D) fulfils certain criteria with respect to the molar amount of bisepoxide compound (B) and diisocyanate compound (A). The ratio r is defined as the absolute value of the molar amount of compound (D) ($n_D$) to the difference between the molar amount of bisepoxide compound (B) ($n_{bisepoxide}$) and the molar amount of diisocyanate compound (A) ($n_{diisocyanate}$) according to the following formula (II)

$$r=|n_D/(n_{bisepoxide}-n_{diisocyanate})| \quad \text{(II)}$$

is preferably in the range of ≥1.5 to ≤2.5, more preferably in the range of ≥1.9 to ≤2.1, and particularly preferred in the range of ≥1.95 to ≤2.05. Without being bound to a theory, all epoxide groups and all isocyanate groups will have reacted at the end of the reaction, when such an amount of chain regulator is being used.

As an alternative, an excess of a mono-epoxide and/or a mono-isocyanate compound is added as chain regulator to the reaction mixture after the reaction between bisepoxide and diisocyanate has been completed. Without being bound to a theory, the terminal epoxide groups or the terminal isocyanate groups resulting from the reaction of the bisepoxide and the diisocyanate will be converted to inert end groups by reaction with the regulator. The excess amount of regulator is subsequently removed from the product, e.g., by extraction, precipitation, distillation, stripping or thin film evaporation.

The present invention further relates to a spun fiber, comprising a thermoplastic polyoxazolidinone according to the invention and a textile, comprising such a spun fiber.

The method according to the invention is suited for the synthesis of oxazolidinones with interesting properties for use, for example, as pharmaceutics or antimicrobiotics.

thermoplastic polyoxazolidinones obtained by the method according to the invention are particularly suited as polymer building blocks in polyurethane chemistry. For example, epoxy-terminated oligomeric oxazolidinones (oligooxazolidinones) may be reacted with polyols or polyamines to form foams or thermosets. Such epoxy-terminated oligomeric oxazolidinones are also suited for the preparation of composite materials. Epoxy-terminated oligomeric oxazolidinones (oligooxazolidinones) may also be reacted with their NCO-terminated counterparts to form high molecular weight thermoplastic polyoxazolidinones, which are useful as transparent, high temperature-stable materials. Thermoplastic polyoxazolidinones with high molecular weight obtained by the method according to the invention are particularly suited as transparent, high temperature-stable thermoplastic materials.

The conventional additives for these thermoplastics, such as fillers, UV stabilizers, heat stabilizers, antistatics and pigments, can also be added in the conventional amounts to the thermoplastic polyoxazolidinones according to the invention; the mould release properties, the flow properties and/or the flame resistance can optionally also be improved by addition of external mould release agents, flow agents and/or flameproofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The thermoplastic polyoxazolidinones obtained according to the current invention have excellent properties regarding stiffness, hardness and chemical resistance.

They are also useful in polymer blends with other polymers such as polystyrene, high-impact polystyrene (polystyrene modified by rubber for toughening, usually polybutadiene), copolymers of styrene such as styrene-acrylonitrile copolymer (SAN), copolymers of styrene, alpha-methylstyrene and acrylonitrile, styrene-methyl methacrylate copoylmers, styrene-maleic anhydride copolymers, styrene-maleimide copolymers, styrene-acrylic acid copolymers, SAN modified by grafting rubbers for toughening such as ABS (acrylonitrile-butadiene-styrene polymer), ASA (acrylonitrile-styrene-acrylate), AES (acrylonirile-EPDM-styrene), ACS (acrylonitrile-chlorinated polyethylene-stryrene) polymers, copolymers of styrene, alpha-methylstyrene and acrylonitrile modified with rubbers such as polybutadiene or EPDM, MBS/MABS (methyl methacrylate-styrene modified with rubber such as polybutadiene or EPDM), aromatic polyesters such as polyethylene terephthalate (PET), polybutylene terephthalate (PBT), polytrimethylene terephthalate (PTT), aliphatic polyamides such as PA6, PA6,6, PA4,6, PA11 or PA12, polylactic acid, aromatic polycarbonates such as the polycarbonate of bisphenol A, co-polycarbonates such as co-polycarbonates of bisphenol A and bisphenol TMC, polymethylmethacrylate (PMMA), polyvinylchloride, polymethyleneoxide (POM), polyphenylene ether, polyphenylene sulphide (PPS, polysulfones, polyetherimide (PEI), polyethylene, polypropylene.

They are also useful for blends in combination with the above polymers or others, for example blends of polycarbonate and ABS, polycarbonate and PET, polycarbonate and PBT, polycarbonate and ABS and PBT or polycarbonate and ABS and PBT.

The properties of the thermoplastic polyoxazolidinones according to this invention or blends with the above-mentioned polymers or others can also be modified by fillers such as glass fibers, hollow or solid glass spheres, silica (for example fumed or precipitated silica), talcum, calcium carbonate, titanium dioxide, carbon fibers, carbon black, natural fibers such as straw, flax, cotton or wood fibers.

Thermoplastic Polyoxazolidinones can be mixed with any usual plastics additive such as antioxidants, light stabilizers, impact modifiers, acid scavengers, lubricants, processing aids, anti-blocking additives, slip additives, antifogging additives, antistatic additives, antimicrobials, chemical blowing agents, colorants, optical brighteners, fillers and reinforcements as well as flame retardant additives.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric shell grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers, materials suitable for use as the rigid phase include, for example, monovinyl aromatic monomers such as styrene and alpha-methyl styrene, and monovinylic monomers such as acrylonitrile, acrylic acid, methacrylic acid, and the C1-C6 esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt %, specifically 3 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The composition may also comprise mineral fillers. In an embodiment, the mineral fillers serve as synergists. The synergist facilitates an improvement in the flame retardant properties when added to the flame retardant composition over a comparative thermoplastic polyoxazolidinone composition that contains all of the same ingredients in the same quantities except for the synergist.

Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers. An exemplary mineral filler it talc having an average particle size of 1 to 3 micrometers.

The mineral filler is present in amounts of 0.1 to 20 wt %, specifically 0.5 to 15 wt %, and more specifically 1 to 5 wt %, based on the total weight of the flame retardant composition.

The thermoplastic polyoxazolidinones can also be colored with a whole range of soluble organic dyes and with pigment dyes, which can be either organic or inorganic.

Further possible uses of the thermoplastic polyoxazolidinones according to the invention are:
01. Housing for electrical appliances (e.g. household appliances, computers, mobile phones, display screens, television, . . . ), including transparent or translucent housing parts like lamp covers.
02. Light guide panels and BLUs
03. Optical Data Storage (CD, DVD, Blu-ray Discs)
04. electrically insulating materials for electrical conductors, for plug housings and plug connectors, carrier material for organic photoconductors, Chip boxes and chip supports, fuse encapsulation
05. Static dissipative/electrically conductive formulations for use in explosion protection applications and others with respective requirements
06. Optics, diffusers, reflectors, light guides as well as housings for LED and conventional Lighting, e.g. streetlights, industrial lamps, searchlights, traffic lights, . . .
07. Thermally conductive formulations for thermal management applications like heatsinks.
08. Applications for Automotive and other Transportation vehicles (cars, buses, trucks, railway, aircrafts, ships) as Glazing, also safety glazing, lighting (e.g. headlamp lenses, tail lights, turn signals, back-up lights, fog lights; bezels and reflectors), sun and panoramic roofs, cockpit canopies, cladding of railway or other cabins, Windscreens, interiors and exteriors parts (e.g. instrument covers, consoles, dashboards, mirror housings, radiator grilles, bumpers, spoilers),
09. EVSE and batteries
10. Metal substitution in gears, seals, supporting rings
11. Roof structures (e.g. for sports arenas, stations, conservatories, greenhouses)
12. windows (including theft-proof windows and projectile-resistant windows, teller's windows, barriers in banks),
13. partition walls
14. solar panels
15. Medical devices (components of blood pumps, autoinjectors and mobile medical-injection pumps, IV access devices, renal therapy and inhalation devices (such as nebulizers, inhalers) sterilisable surgical instruments, medical implants, oxygenators, dialyzers, . . . )
16. Foodcontact applications (tableware, dinnerware, glasses, tumblers, food containers, institutional food trays, water bottles, water filter systems)
17. sports articles, such as e.g. slalom poles or ski boot buckles.
18. household articles, such as e.g. kitchen sinks and letterbox housings.
19. safety applications (glasses, visors or optical corrective glasses, helmets, visors, riot gear (helmets and shields), safety panes)
20. Sunglasses, swimming goggles, SCUBA masks
21. Signs, displays, poster protection
22. Lightweight luggage
23. water fitting, pump impellors, thin hollow fibres for water treatment
24. Industrial pumps, valves and seals, connectors
25. Membranes
26. Gas separation
27. Coating applications (e.g. Anticorrosion paint, powder coating)

This application likewise provides the shaped articles and mouldings and extrudates from the polymers according to the invention.

1. In a first embodiment the invention is related to a process for producing thermoplastic polyoxazolidinone, comprising the following steps:
   (i) Reaction of a diisocyanate compound (A) with a bisepoxide compound (B) in the presence of a catalyst (C) and a compound (D) in a solvent (E) forming an intermediate compound (F)
   (ii) Reaction of a compound (G) with the intermediate (F) formed in step (i),
wherein compound (D) is one or more compounds selected from the group consisting of monofunctional isocyanate and monofunctional epoxide, and wherein compound (G) is an alkylene oxide.

In a second embodiment the invention is related to the process according to the first embodiment, wherein step (i) comprises the following sub-steps:
   (i-1) placing a solvent (E) and a catalyst (C) in a reactor to provide a mixture,
   (i-2) placing the compound (A), the bisepoxide compound (B) and the compound (D) in a vessel to provide a mixture and
   (i-3) adding the mixture resulting from step (i-2) to the mixture resulting from step (i-1).

In a third embodiment the invention is related to the process according to the second embodiment, wherein the mixture resulting from step (i-2) is added in a continuous manner or step-wise manner with two or more individual addition steps to the mixture of step (i-1).

In a fourth embodiment the invention is related to the process according to the second embodiment, wherein the mixture resulting from step (i-2) is added in a step-wise manner with two or more individual addition steps to the mixture of step (i-1).

In a fifth embodiment the invention is related to the process according to the third or fourth embodiment, wherein the compound (G) is added in a step-wise manner with two or more individual addition steps or in continuous manner in step (ii) to the intermediate (F) formed in step (i).

In a sixth embodiment the invention is related to the process according to any of the first to fifth embodiment, wherein the diisocyanate compound (A) is at least one compound selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexyl-propane, poly(hexamethylene diisocyanate), octamethylene diisocyanate, tolylene-α,4-diisocyanate, poly(propylene glycol) tolylene-2,4-diisocyanate terminated, poly(ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocyanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI) and biurets, isocyanurates, carbamates and uretdiones of the aforementioned isocyanates.

In a seventh embodiment the invention is related to the process according to any of the first to sixth embodiment, wherein the bisepoxide compound (B) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether and diglycidyl isophthalate.

In an eighth embodiment the invention is related to the process according to any of the first to seventh embodiment, wherein the catalyst (C) is at least one compound selected from the group consisting of
Li(I), Rb(I), Cs(I), Ag(I), Au(I),
Mg(II), Ca(II), Sr(II), Ba(II), Dy(II), Yb(II), Cu(II), Zn(II), V(II), Mo(II), Mn(II), Fe(II), Co(II)
Ni(II), Pd(II), Pt(II), Ge(II), Sn(II),
Sc(III), Y(III), La(III), Ce(III), Pr(III), Nd(III), Sm(III), Eu(III), Gd(III), Tb(III), Dy(III), Ho(III),
Er(III), Tm(III), Yb(III), Lu(III), Hf(III), Nb(III), Ta(III), Cr(III), Ru(III), Os(III), Rh(III), Ir(III),
Al(III), Ga(III), In(III), Tl(III), Ge(III),
Ce(IV), Ti(IV), Zr(IV), Hf(IV), Nb(IV), Mo(IV), W(IV), Ir(IV), Pt(IV), Sn(IV), Pb(IV), Nb(V), Ta(V), Bi(V), Mo(VI), W(VI), and
compounds represented by the formula (I)

$$[M(R1)(R2)(R3)(R4)]+nYn- \qquad (I)$$

wherein M is nitrogen, phosphorous or antimony, preferred phosphorous
wherein (R1), (R2), (R3), (R4) are independently of one another selected from the group comprising linear or branched alkyl groups containing 1 to 22 carbon atoms, optionally substituted with heteroatoms and/or heteroatom containing substituents, cycloaliphatic groups containing 3 to 22 carbon atoms, optionally substituted with heteroatoms and/or heteroatom containing substituents, C1 to C3 alkyl-bridged cycloaliphatic groups containing 3 to 22 carbon atoms, optionally substituted with heteroatoms and/or heteroatom containing substituents and aryl groups containing 6 to 18 carbon atoms, optionally substituted with one or more alkyl groups containing 1 to 10 carbon atoms and/or heteroatom containing substituents and/or heteroatoms,
wherein Y is a halide, carbonate, nitrate, sulfate or phosphate anion, more preferred a halide or carbonate and
wherein n is an integer of 1, 2 or 3.

In a ninth embodiment the invention is related to the process according to any of the first to eighth embodiment, wherein the catalyst (C) is at least one compound selected from the group consisting of LiCl, LiBr, LiI, MgCl2, MgBr2, MgI2, SmI3, Ph4SbBr, Ph4SbCl, Ph4PBr, Ph4PCl, Ph3(C6H4-OCH3)PBr, Ph3(C6H4-OCH3)PCl, Ph3(C6H4F)PCl, and Ph3(C6H4F)PBr, preferred LiCl, LiBr, and LiI and most preferred LiCl.

In a tenth embodiment the invention is related to the process according to any of the first to ninth embodiment, wherein the compound (D) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide and/or n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate, preferred 4-tert-butylphenyl glycidyl ether, phenyl glycidyl ether and p-tolylisocyanate.

In a eleventh embodiment the invention is related to the process according to any of the first to tenth embodiment, wherein the calculated mass ratio of the sum of diisocyanate compound (A) the bisepoxide compound (B) and the compound (D) with respect to the sum of diisocyanate compound (A) the bisepoxide compound (B) the compound (D) and the solvent (E) in step (i) is from 5 wt-% to 30 wt-%, preferred from 8 wt-% to 26 wt-% and more preferred from 13 wt-% to 24 wt-%.

In a twelfth embodiment the invention is related to the process according to any of the second to eleventh embodiment, wherein the solvent (E) in step (i-1) further comprises a solvent (E-1).

In a thirteenth embodiment the invention is related to the process according to any of the first to twelfth embodiment, wherein the compound (G) is a monofunctional alkylene oxide (G-1).

In a fourteenth embodiment the invention is related to the process according to the thirteenth embodiment, wherein the monofunctional alkylene oxide (G-1) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide and butadiene monoepoxide N-glycidyl phthalimide.

In a fifteenth embodiment the invention is related to the process according to any of the first to fourteenth embodiment, wherein the compound (D) and compound (G) is the monofunctional alkylene oxide (G-1).

In a sixteenth embodiment the invention is related to the process according to the fifteenth embodiment, wherein the monofunctional alkylene oxide (G-1) is at least one compound selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, and butadiene monoepoxide N-glycidyl phthalimide.

In an seventeenth embodiment the invention is related to thermoplastic polyoxazolidinone, obtainable by a process according to one of the first to sixteenth embodiment.

In a eighteenth embodiment the invention is related to the thermoplastic polyoxazolidinone according to the seventeenth embodiment with a number average molecular weight $M_n$ from ≥500 to ≤500'000 g/mol, more preferred ≥1'000 to ≤50'000 g/mol and even more preferred ≥5'000 to ≤25'0000 g/mol as determined with gel permeation chromatography (GPC), wherein the GPC was performed on an Agilent 1100 Series instrument with DMAC+LiBr (1.7 g·L−1) as the eluent, PSS GRAM analytical columns (1×100 Å, 2×3000 Å) from PSS, equipped with a refractive index (RI) detector, wherein the column flow rate in all measurements was set to 1 mL·min−1. For determining molecular weights, the calibration was performed with poly(styrene) standards (ReadyCal-Kit PS—Mp 370-2520000 Da from PSS) and the samples were analysed using PSS WinGPC UniChrom V 8.2 Software.

In a nineteenth embodiment the invention is related to the process according to any of the first to sixteenth embodiment, wherein step i) is performed at reaction temperatures of ≥130° C. to ≤280° C., preferably at a temperature of ≥140° C. to ≤240° C., more preferred at a temperature of ≥155° C. to ≤210° C.

In a twentieth embodiment the invention is related to the process according to any of the first to sixteenth and twentieth embodiment, wherein step i) is performed at reaction times of 1 h to 20 h, preferably at 1 h to 10 h and more preferably at 1 h to 6 h.

In a twenty-first embodiment the invention is related to the process according to any of the first to sixteenth and twentieth to twenty first embodiment, wherein step ii) is performed at reaction temperatures of ≥130° C. to ≤280° C., preferably at a temperature of ≥140° C. to ≤240° C., more preferred at a temperature of ≥155° C. to ≤210° C.

In a twenty-second embodiment the invention is related to the process according to any of the first to sixteenth and twentieth to twenty second embodiment, wherein step ii) is performed at reaction times of 1 h to 20 h, preferably at 1 h to 10 h and more preferably at 1 h to 6 h.

In a twenty-third embodiment the invention is related to the process according to any of the first to sixteenth and twentieth to twenty third embodiment, wherein the compound (G) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone.

In a twenty-fourth embodiment of the invention is related to an intermediate compound (F), obtainable by a process according to one of the first to twenty-third embodiment.

In a twenty-fifth embodiment of the invention is related to the intermediate compound (F) according to the twenty-fourth with a number average molecular weight Mn from ≥500 to ≤500'000 g/mol, more preferred ≥1'000 to ≤50'000 g/mol and even more preferred ≥5'000 to ≤25'0000 g/mol as determined with gel permeation chromatography (GPC), wherein the GPC was performed on an Agilent 1100 Series instrument with DMAC+LiBr (1.7 g·L−1) as the eluent, PSS GRAM analytical columns (1×100 Å, 2×3000 Å) from PSS, equipped with a refractive index (RI) detector, wherein the column flow rate in all measurements was set to 1 mL·min−1. For determining molecular weights, the calibration was performed with poly(styrene) standards (ReadyCal-Kit PS—Mp 370-2520000 Da from PSS) and the samples were analysed using PSS WinGPC UniChrom V 8.2 Software.

EXAMPLES

The present invention will be further described with reference to the following examples without wishing to be limited by them.

Diisocyanate Compound (A)

MDI Methylene diphenyl diisocyanate, 98%, Covestro AG, Germany

Epoxide Compound (B)

BADGE 2-[[4-[2-[4-(Oxiran-2-ylmethoxy)phenyl]propan-2-yl]phenoxy]methyl]oxirane (Bisphenol A diglycidyl ether), difunctional epoxide (Hexion, 98%)

Catalyst (C)

LiCl Lithium chloride (Sigma-Aldrich, ≥99.9%)

Compound (D) and (G-1)

BPGE para-tert-butylphenyl glycidyl ether (ABCR Dr. Braunagel GmbH+Co.KG)

Solvents (E)

Ortho-dichlorobenzene (o-DCB), purity 99%, anhydrous, was obtained from Sigma-Aldrich, Germany N-Methylpyrrolidone (NMP), purity 99.5%, anhydrous, was obtained from Sigma-Aldrich, Germany.

Solvents (E-1)

Sulfolane (Acros Organic, 99%)

MDI, NMP, LiCl, and BPGE were used as received without further purification. BADGE (Epikote 162) and sulfolane were used after melting at 50° C. and drying over molecular sieve. o-DCB was dried over molecular sieve prior to use.

Characterisation of Thermoplastic polyoxazolidinone

IR

Solid state IR analyses were performed on a Bruker ALPHA IR spectrometer equipped with a diamond probe head. The software OPUS 7.5 was used for data treatment. A background spectrum was recorded against ambient air. Thereafter, a small sample of the thermoplastic polyoxazolidinone (2 mg) was applied to the diamond probe and the IR spectrum recorded averaging over 24 spectra obtained in the range of 4000 to 400 cm$^{-1}$ with a resolution of 4 cm$^{-1}$.

Molecular Weight

The average chain length of the thermoplastic polyoxazolidinones was controlled by the molar ratio of bisepoxide, diisocyanate and/or compound (D).

The formula below gives a general mathematical formula to calculate the average chain length n in the polymeric product obtained with a diisocyanate (A) and a bisepoxide (B):

$$n=(1+q)/(1+q-2pq) \tag{III}$$

with $q=n_x/n_y \le 1$ and x,y=bisepoxide (B) or diisocyanate (A)

and with the conversion p whereby $n_x$ and $n_y$ are the molar amounts of bisepoxide or diisocyanate, respectively.

The average molecular weight M of the thermoplastic polyoxazolidinones can be calculated by the formula given below $$M=n*((M_A+M_B)/2)+(2*M_D) \tag{IV}$$

With $M_A$, $M_B$, and $M_D$ being the molar masses of the compounds (A), (B), and (D).

TGA

The stability of the thermoplastic polyoxazolidinones was characterized by thermogravimetric analysis (TGA).

The measurements were performed on a TGA/SDTA 851e system from Mettler Toledo.

Measurements were performed in the temperature range from 30 to 500° C. at a heating rate of 5 K·min$^{-1}$. For the analysis, the offset was set at 250° C. The decomposition temperature (Ta) stated is the onset point determined from the step tangent of the sinusoidal weight loss curve. Analysis with heating phases of 1 h where performed at 260° C. and 280° C., respectively. Subsequently, the samples where cooled down and utilized for further analytics. The sample (6 to 20 mg) was weighed in a 70 L alox pan (previously cleaned at 1000° C. for 7 h).

GPC

The determination of the number average molecular weights, weight average molecular weights and the polydispersity index were carried out by gel permeation chromatography (GPC). GPC was performed on an Agilent 1100 Series instrument with DMAC+LiBr (1.7 g·L−1) as the eluent, PSS GRAM analytical columns (1×100 Å, 2×3000 Å) from PSS, equipped with a refractive index (RI) detector. The column flow rate in all measurements was set to 1 mL·min$^{-1}$. For determining molecular weights, the calibration was performed with poly(styrene) standards (ReadyCal-Kit PS—Mp 370-2520000 Da from PSS). The samples were analysed using PSS WinGPC UniChrom V 8.2 Software.

Example 1: Reaction of bisphenol A diglycidyl ether as bisepoxide Compound (B) with methylene diphenyl diisocyanate as diisocyanate Compound (A), using LiCl as Catalyst (C) and para-tert-butylphenyl glycidyl ether as Compound (D) Added in Step (i) and as Compound (G) Added in Step (ii)

Under a continuous flow of nitrogen, a glass flask (500 mL) was charged with LiCl (0.0999 g) and sulfolane (20 mL) and stirred at 175° C. for 15 min. Subsequently, ortho-dichlorobenzene (58 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 67 mL ortho-dichlorobenzene. The monomer solution was added slowly to the catalyst solution within 90 min. After the addition was finished, the reaction was stirred at 175° C. for another 30 min. After a total reaction time of 120 min, para-tert-butylphenyl glycidyl ether (4.862 g), dissolved in ortho-dichlorobenzene (10 mL), was added to the reaction solution. After the addition, the reaction was stirred at 175° C. for another 30 min. The completion of the reaction was confirmed by the absence of the isocyanate band (2260 cm$^{-1}$) in the IR spectrum of the reaction mixture. Subsequently, 80 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.25 wt. %. Subsequent GPC analysis of the isolated sample showed a slight decomposition of the molecular weight for 280° C.-tempered material.

In the solid state IR spectrum the characteristic signal for the oxazolidinone carbonyl group was observed at 1750 cm$^{-1}$.

Example 2 (Comparison): Reaction of bisphenol A diglycidyl ether as bisepoxide Compound (B) with methylene diphenyl diisocyanate as diisocyanate Compound (A), Using LiCl as Catalyst (C) and para-tert-butylphenyl glycidyl ether as Compound (D) Added in Step (i)

Under a continuous flow of nitrogen, a glass flask (500 mL) was charged with LiCl (0.0999 g) and sulfolane (20 mL) and stirred at 175° C. for 15 min. Subsequently, ortho-dichlorobenzene (68 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 67 mL ortho-dichlorobenzene. The monomer solution was added slowly to the catalyst solution within 90 min. After the addition was finished, the reaction was stirred at 175° C. for another 60 min. The completion of the reaction was confirmed by the absence of the isocyanate band (2260 cm$^{-1}$) in the IR spectrum of the reaction mixture. Subsequently, 80 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.59 wt. %. Subsequent GPC analysis of the isolated sample showed molecular weight decomposition for 280° C.-tempered material.

In the solid state IR spectrum the characteristic signal for the oxazolidinone carbonyl group was observed at 1750 cm$^{-1}$.

Example 3 (Comparison): Reaction of Bisphenol a Diglycidyl Ether as Bisepoxide Compound (B) with Methylene Diphenyl Diisocyanate as Diisocyanate Compound (A), Using LiCl as Catalyst (C) and Para-Tert-Butylphenyl Glycidyl Ether as Compound (G) Added in Step (ii)

Under a continuous flow of nitrogen, a glass flask (500 mL) was charged with LiCl (0.0999 g) and sulfolane (20 mL) and stirred at 175° C. for 15 min. Subsequently, ortho-dichlorobenzene (58 mL) was added. A glass flask (200 mL) was charged with methylene diphenyl diisocyanate (29.4920 g) and bisphenol A glycidyl ether (39.3150 g), and 67 mL ortho-dichlorobenzene. The monomer solution was added slowly to the catalyst solution within 90 min. After the addition was finished, the reaction was stirred at 175° C. for another 30 min. After a total reaction time of 120 min, para-tert-butylphenyl glycidyl ether (4.862 g), dissolved in ortho-dichlorobenzene (10 mL), was added to the reaction solution. After the addition, the reaction was stirred at 175° C. for another 60 min. The completion of the reaction was confirmed by the absence of the isocyanate band (2260 cm$^{-1}$) in the IR spectrum of the reaction mixture. Subsequently, 80 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 1.18 wt. %. Subsequent GPC analysis of the isolated sample showed molecular weight decomposition for 280° C.-tempered material.

In the solid state IR spectrum the characteristic signal for the oxazolidinone carbonyl group was observed at 1750 cm$^{-1}$.

Example 4: Reaction of bisphenol A diglycidyl ether as bisepoxide Compound (B) with methylene diphenyl diisocyanate as diisocyanate Compound (A), and LiCl as Catalyst (C) and paara-tert-butylphenyl glycidyl ether as Compound (D) Added in Step (i) and as Compound (F) Added in Step (ii) Using a Lower Monomer Concentration with $(m(A)+m(B)+m(C))/(m(A)+m(B)+m(C)+m(E))=20$ wt-%

Under a continuous flow of nitrogen, a glass flask (500 mL) was charged with LiCl (0.0999 g) and sulfolane (28 mL) and stirred at 175° C. for 15 min. Subsequently, ortho-dichlorobenzene (95 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 85 mL ortho-dichlorobenzene. The monomer solution was added slowly to the catalyst solution within 90 min. After the addition was finished, the reaction was stirred at 175° C. for another 30 min. After a total reaction time of 120 min, para-tert-butylphenyl glycidyl ether (4.862 g), dissolved in ortho-dichlorobenzene (10 mL), was added to the reaction solution. After the addition, the reaction was stirred at 175° C. for another 60 min. The completion of the reaction was confirmed by the absence of the isocyanate band (2260 cm$^{-1}$) in the IR spectrum of the reaction mixture. Subsequently, 112 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss 0.16 wt. %, respectively. Subsequent GPC analysis of the isolated samples showed only minor changes in the molecular weight for 280° C.-tempered material.

In the solid state IR spectrum the characteristic signal for the oxazolidinone carbonyl group was observed at 1750 cm$^{-1}$.

Example 5 (Comparison): Reaction of bisphenol A diglycidyl ether as bisepoxide Compound (B) with methylene diphenyl diisocyanate as diisocyanate Compound (A), Using LiCl as Catalyst (C) and para-tert-butylphenyl glycidyl ether as Compound (D) Added in Step (i) Using a Lower Monomer Concentration with (m(A)+m(B)+m(C))/(m(A)+m(B)+m(C)+m(E))=20 wt-%

Under a continuous flow of nitrogen, a glass flask (500 mL) was charged with LiCi (0.0999 g) and sulfolane (28 mL) and stirred at 175° C. for 15 min. Subsequently, ortho-dichlorobenzene (95 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 95 mL ortho-dichlorobenzene. The monomer solution was added slowly to the catalyst solution within 90 min. After the addition was finished, the reaction was stirred at 175° C. for another 60 min. The completion of the reaction was confirmed by the absence of the isocyanate band (2260 cm$^{-1}$) in the IR spectrum of the reaction mixture. Subsequently, 112 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.48 wt. %. Subsequent GPC analysis of the isolated sample showed molecular weight decomposition for 280° C.-tempered material.

In the solid state IR spectrum the characteristic signal for the oxazolidinone carbonyl group was observed at 1750 cm$^{-1}$.

Example 6: Reaction of bisphenol A diglycidyl ether as bisepoxide Compound (B) with methylene diphenyl diisocyanate as diisocyanate Compound (A), Using LiCl as Catalyst (C) and para-tert-butylphenyl glycidyl ether as Compound (D) Added in Step (i) Using a Lower Monomer Concentration with (m(A)+m(B)+m(C))/(m(A)+m(B)+m(C)+m(E)) =23 wt-%

Under a continuous flow of nitrogen, a glass flask (500 mL) was charged with LiCl (0.0999 g) and sulfolane (22.5 mL) and stirred at 175° C. for 15 min. Subsequently, ortho-dichlorobenzene (76.5 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 76 mL ortho-dichlorobenzene. The monomer solution was added slowly to the catalyst solution within 90 min. After the addition was finished, the reaction was stirred at 175° C. for another 60 min. The completion of the reaction was confirmed by the absence of the isocyanate band (2260 cm$^{-1}$) in the IR spectrum of the reaction mixture. Subsequently, 90 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.64 wt. %. Subsequent GPC analysis of the isolated samples showed some molecular weight decomposition for 280° C.-tempered material.

In the solid state IR spectrum the characteristic signal for the oxazolidinone carbonyl group was observed at 1750 cm$^{-1}$.

Example 7: Reaction of Bisphenol a Diglycidyl Ether as Bisepoxide Compound (B) with Methylene Diphenyl Diisocyanate as Diisocyanate Compound (A), Using LiCl as Catalyst (C)

Under a continuous flow of nitrogen, a glass flask (500 mL) was charged with LiCl (0.0999 g) and sulfolane (28 mL) and stirred at 175° C. for 15 min. Subsequently, ortho-dichlorobenzene (95 mL) was added. A glass flask (200 mL) was charged with methylene diphenyl diisocyanate (29.4920 g) and bisphenol A glycidyl ether (40,1173 g), and 95 mL ortho-dichlorobenzene. The monomer solution was added slowly to the catalyst solution within 90 min. After the addition was finished, the reaction was stirred at 175° C. for another 60 min. The completion of the reaction was confirmed by the absence of the isocyanate band (2260 cm$^{-1}$) in the IR spectrum of the reaction mixture. Subsequently, 112 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.26 wt. %. Subsequent GPC analysis of the isolated samples showed clear molecular weight decomposition for 280° C.-tempered material.

In the solid state IR spectrum the characteristic signal for the oxazolidinone carbonyl group was observed at 1750 cm$^{-1}$.

Example 8: Reaction of bisphenol A diglycidyl ether as bisepoxide Compound (B) with methylene diphenyl diisocyanate as diisocyanate Compound (A), Using LiCl as Catalyst (C) and paara-tert-butylphenyl glycidyl ether as Compound (D) Added in Step (i) and as Compound (F) Added in Step (ii) Using a Lower Monomer Concentration with (m(A)+m(B)+m(C))/(m(A)+m(B)+m(C)+m(E))=23 wt-%

Under a continuous flow of nitrogen, a glass flask (500 mL) was charged with LiCl (0.0999 g) and sulfolane (22.5 mL) and stirred at 175° C. for 15 min. Subsequently, ortho-dichlorobenzene (76.5 mL) was added. A glass flask (200 mL) was charged with methylene diphenyl diisocyanate (29.4920 g), para-tert-butylphenyl glycidyl ether (0.9724 g), bisphenol A glycidyl ether (39.3150 g), and 66 mL ortho-dichlorobenzene. The monomer solution was added slowly to the catalyst solution within 90 min. After the addition was finished, the reaction was stirred at 175° C. for another 30 min. After a total reaction time of 120 min, para-tert-butylphenyl glycidyl ether (4.862 g), dissolved in ortho-dichlorobenzene (10 mL), was added to the reaction solution. After the addition, the reaction was stirred at 175° C. for another 60 min. The completion of the reaction was confirmed by the absence of the isocyanate band (2260 cm$^{-1}$) in the IR spectrum of the reaction mixture. Subsequently, 90 mL of N-methyl pyrrolidone were added to the reaction solution and the mixture was cooled to ambient temperature. The precipitation of the polymer was performed in ethanol at ambient temperature: The solution (50 mL) was added slowly into 400 mL of ethanol and milled with an ultraturrax dispersing instrument. The product was washed with ethanol, filtered, and dried at ambient temperature overnight. Subsequently, the product was dried under vacuum at 200° C. for 6 h.

Thermogravimetric analysis of the product (tempering at 280° C. for 1 h) showed mass loss of 0.65 wt. %. Subsequent GPC analysis of the isolated samples showed minor changes in the molecular weight for 280° C.-tempered material.

In the solid state IR spectrum the characteristic signal for the oxazolidinone carbonyl group was observed at 1750 cm$^{-1}$.

(i-3) adding the mixture resulting from step (i-2) to the mixture resulting from step (i-1).

3. The process according to claim 2, wherein the mixture resulting from step (i-2) is added in a continuous manner or step-wise manner with two or more individual addition steps to the mixture of step (i-1).

4. The process according to claim 2, wherein the alkylene oxide is added in a step-wise manner with two or more individual addition steps or in continuous manner in step (ii) to the intermediate formed in step (i).

5. The process according to claim 1, wherein the catalyst comprises Li(I), Rb(I), Cs(I), Ag(I), Au(I), Mg(II), Ca(II), Sr(II), Ba(II), Dy(II), Yb(II), Cu(II), Zn(II), V(II), Mo(II), Mn(II), Fe(II), Co(II), Ni(II), Pd(II), Pt(II), Ge(II), Sn(II), Sc(III), Y(III), La(III), Ce(III), Pr(III), Nd(III), Sm(III), Eu(III), Gd(III), Tb(III), Dy(III), Ho(III), Er(III), Tm(III), Yb(III), Lu(III), Hf(III), Nb(III), Ta(III), Cr(III), Ru(III), Os(III), Rh(III), Ir(III), Al(III), Ga(III), In(III), Tl(III), Ge(III),

TABLE

Comparison of the results of Examples 1 to 8:

| Example | Compound (A) | (B) | (C) | (D) Step (i) | (G) Step (ii) | (m(A) + m(B) + m(C))/(m(A) + m(B) + m(C) + m(E)) [wt-%] | $t_{step\ i}$ [h]/ $t_{step\ ii}$ [h] | X(A) | After synthesis Mn(S) [g/mol] | PDI | Treatement at 280° C. for 1 h Mn(280) [g/mol] | PDI | ΔMn [%] |
|---|---|---|---|---|---|---|---|---|---|---|---|---|---|
| 1 | MDI | BADGE | LiCl | BPGE | BPGE | 26.0 | 2/0.5 | complete | 15820 | 5.36 | 13590 | 4.98 | −14.1 |
| 2 (Comp.) | MDI | BADGE | LiCl | BPGE | — | 26.0 | 2.5/— | complete | 14670 | 7.09 | 11390 | 8.67 | −22.4 |
| 3 (Comp.) | MDI | BADGE | LiCl | — | BPGE | 26.0 | 2/1 | incomplete | 15905 | 10.33 | 12665 | 12.25 | −20.37 |
| 4 | MDI | BADGE | LiCl | BPGE | BPGE | 20.0 | 2/1 | complete | 11910 | 6.03 | 11700 | 5.14 | −1.2 |
| 5 (Comp.) | MDI | BADGE | LiCl | BPGE | — | 20.0 | 2.5/— | complete | 13650 | 6.39 | 12210 | 6.93 | −10.55 |
| 6 (Comp.) | MDI | BADGE | LiCl | BPGE | — | 23.0 | 2.5/— | complete | 13520 | 5.09 | 12340 | 6.65 | −8.7 |
| 7 (Comp.) | MDI | BADGE | LiCl | — | — | 20 | 2.5/— | complete | 14230 | 12.9 | 11540 | 11.7 | −18.9 |
| 8 | MDI | BADGE | LiCl | BPGE | BPGE | 23.0 | 2/1 | complete | 11440 | 5.70 | 11350 | 6.37 | −0.79 |

$t_{step\ i}$ [h], $t_{step\ ii}$ [h] $t_{step\ i}$ starts with the dosing of compound (A), (B), and optionally (D). $t_{step\ i}$ ends when no residual isocyanate band can be detected in IR spectroscopy and before compound (G) is added. $t_{step\ ii}$ starts with the addition of compound (G) and ends before NMP is added to the reaction.
X(A) Conversion of isocyanates as compound (A) estimated by IR spectroscopy of the reaction mixture at the end of step (i) (before step (ii))
Mn(S), Mn(280) Number average molecular weights for the polyoxazolidone compounds after synthesis (S) and after treatment at 280° C. for 1 h (280).
PDI Polydispersity index (PDI) defined as ratio of the weight average molecular weight and the number average molecular weight determined by GPC
ΔMn Change of the number average molecular weight after thermal treatment, calculated as the ratio of the number average molecular weights for the polyoxazolidone compounds after treatment at 280° C. and after synthesis, according to the following formula: $\Delta Mn = (M_n(280)/M_n(S) - 1)*100$

The invention claimed is:

1. A process for producing a thermoplastic polyoxazolidinone, comprising:
   reacting a diisocyanate compound with a bisepoxide compound in the presence of components comprising a catalyst and a chain regulator comprising a monofunctional epoxide, a monofunctional isocyanate, or a mixture thereof in a solvent to thereby form an intermediate compound; and
   (ii) reacting an alkylene oxide with the intermediate compound formed in step (i),
   wherein a calculated mass ratio of the sum of the weight of diisocyanate compound, bisepoxide compound, and chain regulator used to the sum of the weight of diisocyanate compound, bisepoxide compound, chain regulator, and solvent in step (i) is from 5 wt % to 30 wt %.

2. The process according to claim 1, wherein step (i) comprises:
   (i-1) placing the solvent and the catalyst in a reactor to provide a mixture,
   (i-2) placing the diisocyanate compound, the bisepoxide compound and the chain regulator in a vessel to provide a mixture, and Ce(IV), Ti(IV), Zr(IV), Hf(IV), Nb(IV), Mo(IV), W(IV), Ir(IV), Pt(IV), Sn(IV), Pb(IV), Nb(V), Ta(V), Bi(V), Mo(VI), W(VI), a compound represented by the formula (I)

[M(R1)(R2)(R3)(R4)]+n Yn−    (I)

or a combination of any two or more thereof, wherein
   M is nitrogen, phosphorous or antimony,
   (R1), (R2), (R3), (R4) are each independently of one another a linear or branched alkyl group containing 1 to 22 carbon atoms, optionally substituted with heteroatoms and/or heteroatom containing substituents, a cycloaliphatic group containing 3 to 22 carbon atoms, optionally substituted with heteroatoms and/or heteroatom containing substituents, a C1 to C3 alkyl-bridged cycloaliphatic group containing 3 to 22 carbon atoms, optionally substituted with heteroatoms and/or heteroatom containing substituents, or an aryl group containing 6 to 18 carbon atoms, optionally substituted with one or more alkyl groups containing 1 to 10 carbon atoms and/or heteroatom containing substituents and/or heteroatoms, Y is a halide, carbonate, nitrate, sulfate or phosphate anion, and n is an integer of 1, 2 or 3.

6. The process according to claim 1, wherein the catalyst comprises LiCl, LiBr, LiI, MgCl2, MgBr2, MgI2, SmI3, Ph4SbBr, Ph4SbCl, Ph4PBr, Ph4PCl, Ph3(C6H4-OCH3)PBr, Ph3(C6H4-OCH3)PCl, Ph3(C6H4F)PCl, Ph3(C6H4F)PBr, or a combination of any two or more thereof.

7. The process according to claim 1, wherein the chain regulator comprises phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, an oxide of a C10-C18 alpha-olefin, cyclohexene oxide, vinylcyclohexene monoxide, limonene monoxide, butadiene monoepoxide, N-glycidyl phthalimide, n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, or para-tolyl isocyanate, a 2,3,4 isomer of chlorophenyl isocyanate, dichlorophenyl isocyanate, 4-nitrophenyl isocyanate, 3-trifluoromethylphenyl isocyanate, benzyl isocyanate, dimethylphenylisocyanate, 4-dodecylphenylisocyanat, 4-cyclohexyl-phenyl isocyanate, 4-pentyl-phenyl isocyanate, 4-t-butyl phenyl isocyanate, 1-naphthyl isocyanate, preferred 4-tert-butylphenyl glycidyl ether, phenyl glycidyl ether, p-tolylisocyanate, or a combination of any two or more thereof.

8. The process according to claim 2, wherein the solvent in step (i-1) comprises sulfolane, gamma-butyrolactone, dimethylsulfoxide or N-methylpyrrolidone.

9. The process according to claim 1, wherein alkylene oxide comprises a monofunctional alkylene oxide.

10. The process according to claim 9, wherein the monofunctional alkylene oxide comprises phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, a C10-C18 alkyl glycidyl ether, allyl glycidyl ether, ethylene oxide, propylene oxide, styrene oxide, 1,2-butene oxide, 2,3-butene oxide, 1,2-hexene oxide, an oxide of a C10-C18 alpha-olefin, cyclohexene oxide, vinylcyclohexene monoxide, limonene monoxide, butadiene monoepoxide N-glycidyl phthalimide, or a combination of any two or more thereof.

11. The process according to claim 1, wherein step i) is performed at a reaction time of 1 hour to 20 hours.

12. The process according to claim 1, wherein, step ii) is performed at a reaction time of 1 hour to 20 hours.

13. The process of claim 1, wherein the calculated mass ratio of the sum of the weight of diisocyanate compound, bisepoxide compound, and chain regulator used to the sum of the weight of diisocyanate compound, bisepoxide compound, chain regulator, and solvent in step (i) is from 8 wt-% to 26 wt-%.

14. The process of claim 1, wherein the calculated mass ratio of the sum of the weight of diisocyanate compound, bisepoxide compound, and chain regulator used to the sum of the weight of diisocyanate compound, bisepoxide compound, chain regulator, and solvent in step (i) is from 13 wt-% to 24 wt-%.

15. A thermoplastic polyoxazolidinone obtained by the process according to claim 1, wherein the thermoplastic polyoxazolidinone has a number average molecular weight Mn from ≥500 to ≤500,000 g/mol as determined with gel permeation chromatography.

* * * * *